(12) United States Patent
Lee et al.

(10) Patent No.: US 8,994,654 B2
(45) Date of Patent: Mar. 31, 2015

(54) APPARATUS AND METHOD FOR CONTROLLING GAZE TRACKING

(71) Applicant: Hyundai Motor Company, Seoul (KR)

(72) Inventors: Seok Beom Lee, Seoul (KR); Hee Jin Ro, Seoul (KR); Dong Hee Seok, Seoul (KR); Sung Min Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 142 days.

(21) Appl. No.: 13/888,523

(22) Filed: May 7, 2013

(65) Prior Publication Data

US 2014/0160005 A1    Jun. 12, 2014

(30) Foreign Application Priority Data

Dec. 12, 2012  (KR) .................. 10-2012-0144894

(51) Int. Cl.
*G09G 5/00*     (2006.01)
*G06F 3/01*     (2006.01)

(52) U.S. Cl.
CPC .................................... *G06F 3/017* (2013.01)
USPC ...................................................... 345/156

(58) Field of Classification Search
None
See application file for complete search history.

(56) References Cited

U.S. PATENT DOCUMENTS

| 2005/0254724 A1* | 11/2005 | Seesselberg et al. ......... 382/274 |
| 2007/0216798 A1* | 9/2007 | Northcott et al. ............. 348/370 |
| 2010/0188528 A1* | 7/2010 | Iwata et al. ............. 348/231.99 |
| 2011/0199492 A1* | 8/2011 | Kauker et al. ............. 348/208.1 |

FOREIGN PATENT DOCUMENTS

| JP | 2002102172 A | 4/2002 |
| JP | 2007136000 A | 6/2007 |
| KR | 2002-0063669 A | 8/2002 |
| KR | 2002-0086977 A | 11/2002 |
| KR | 10-2011-0038568 | 4/2011 |
| KR | 10-2011-0118965 | 11/2011 |

* cited by examiner

*Primary Examiner* — Jason Olson
(74) *Attorney, Agent, or Firm* — Mintz Levin Cohn Ferris Glovsky and Popeo, P.C.; Peter F. Corless

(57) ABSTRACT

An apparatus and a method that controls gaze tracking. The apparatus includes an imaging device that has an image sensor divided into a plurality of zones and a gaze tracking controller. The gaze tracking controller is configured to determine a lens PSF and an image sensor PSF of the camera, respectively, using images for each zone acquired from image elements disposed in each zone of the image sensor. In addition, the gaze tracking controller is configured to estimate illumination reflection points using an imaging device PSF determined from the determined lens and image sensor PSFs at the time of detecting a user gaze using the imaging device.

17 Claims, 4 Drawing Sheets

APPARATUS AND METHOD FOR CONTROLLING GAZE TRACKING

CROSS-REFERENCE TO RELATED APPLICATION

This application is based on and claims priority from Korean Patent Application No. 10-2012-0144894, filed on Dec. 12, 2012 in the Korean Intellectual Property Office, the disclosure of which is incorporated herein in its entirety by reference.

BACKGROUND OF THE INVENTION

1. Field of the invention

The present invention relates to an apparatus and a method that controls gaze tracking, and more particularly, to a technology of determining a point spread function (PSF) of an imaging device using characteristic information received from an image sensor divided into a plurality of zones and a lens and estimating central values of reflection points from the determined PSF.

2. Description of the Prior Art

Gaze tracking has been applied to various fields, such as driver's state monitoring, driver's intention determinations, and an operation of devices within a gaze interlocking car, and the like. Recently, an interest in monitoring driver's attention dispersion has been increased. For various applications of gaze tracking, there is a need to accurately estimate a gaze direction. For this purpose, there is a need to detect the position of the reflection point by radiating infrared (IR) illumination to a cornea of an eye.

However, the reflection point of the eye changes according to a driver and a driver's position, and thus, errors may occur. In addition, for this purpose, a need exists for a high-resolution imaging device, which may be difficult to apply to a vehicle due to factors, such as an increased cost, computation load, and the like.

SUMMARY

Accordingly, the present invention provides an apparatus and a method that controls gaze tracking by accurately providing central values of reflection points with a lowered error rate by estimating a reflection point based on images for each zone acquired by dividing an image sensor into a plurality of zones and characteristic information received from the image sensor and a lens.

Additionally, the present invention provides an apparatus and a method that controls gaze tracking by reducing sensitivity of a point spread function (PSF) while determining lens PSF by converting coordinates acquired by an imaging device (e.g., a camera) into an incidence angle and detecting a reflection point more accurately by compensating for light spreading due to a lens and an image element by determining the lens PSF and an image sensor PSF, respectively and determining a PSF of an imaging device from the lens PSF and the image sensor PSF.

In one aspect of the present invention, an apparatus that controls gaze tracking may include: a gaze tracking controller that may be configured to determine a lens PSF and an image sensor PSF of the imaging device, respectively, using images for each zone acquired from image elements disposed in each zone of the image sensor and to estimate illumination reflection points using an imaging device PSF determined from the determined lens and image sensor PSFs at the time of detecting user's gaze using the imaging device.

The gaze tracking controller may include a plurality of units executed by the gaze tracking controller that includes a processor and a storage device. The plurality of units may include an incidence angle calculation unit configured to calculate an incidence angle to the lens of the imaging device with respect to the images for each zone; a PSF determination unit configured to determine the lens PSF and the image sensor PSF based on the calculated incidence angle and location information of the image elements disposed in each zone and determine the imaging device PSF from the lens PSF and the image sensor PSF; a reflection point estimation unit configured to estimate the illumination reflection points using the images for each zone and the imaging device PSF; and a central value determination unit configured to determine central values of the estimated reflection points.

The PSF determination unit may be configured to determine the imaging device PSF from a product of the lens PSF and the image sensor PSF. The reflection point estimation unit may be configured to calculate the estimated illumination reflection points using the determined imaging device PSF and coordinate information of the reflection points acquired from images from each zone. The central value determination unit may be configured to determine as a central value a point having a maximum value among the estimated reflection points.

In another aspect of the present invention, a method that controls gaze tracking may include: receiving, at the gaze tracking controller, images for each zone from image sensors divided into a plurality of zones of an imaging device; determining, by the gaze tracking controller, a lens PSF and an image sensor PSF of the imaging device, respectively, using the images for each zone and determining an imaging device PSF from the lens PSF and the image sensor PSF; estimating, by the gaze tracking controller, illumination reflection points for an input image using the imaging device PSF; and determining, by the gaze tracking controller, a central value of the estimated reflection points.

In the estimating of the illumination reflection points, the estimated reflection points may be calculated based on the determined imaging device PSF and coordinate information of the reflection points acquired from images from each zone. In the determining of the central value, a point having a maximum value among the estimated reflection points may be determined as a central value.

The method for controlling gaze tracking may further include: calculating, by the gaze tracking controller, an incidence angle to the lens of the imaging device with respect to the images for each zone. In the determining of the imaging device PSF, the lens PSF and the image sensor PSF may be determined based on the calculated incidence angle and position information for each zone of the image sensor. In the determining of the imaging device PSF, the imaging device PSF may be determined from a product of the lens PSF and the image sensor PSF.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

Figure 1:
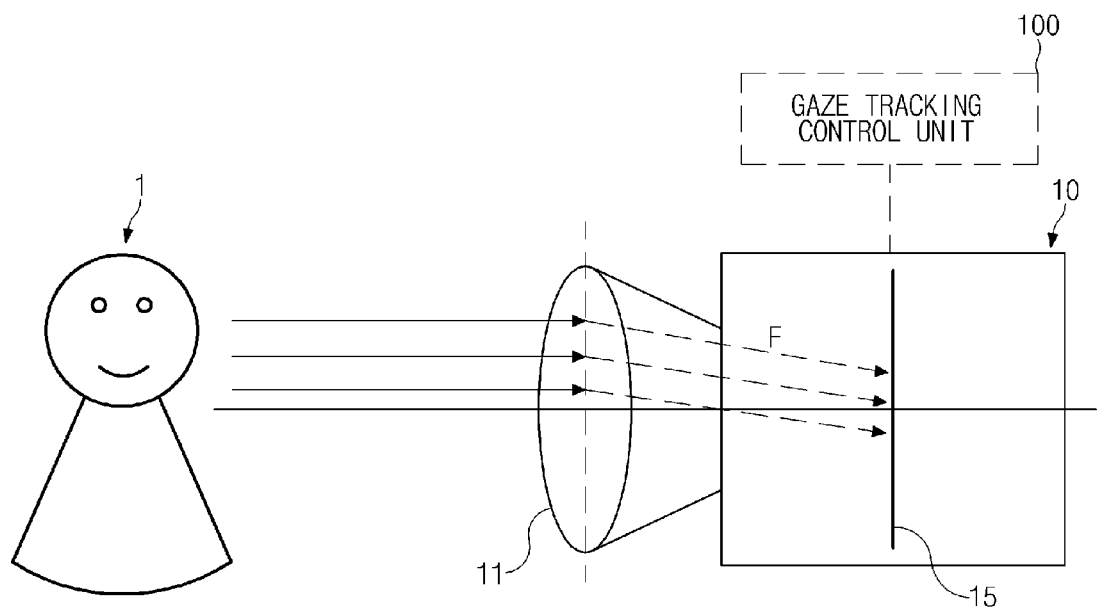
FIG. 1 is an exemplary diagram illustrating a configuration of an apparatus that controls gaze tracking according to an exemplary embodiment of the present invention.

FIG. 1 is a diagram illustrating a configuration of an apparatus that controls gaze tracking according to an exemplary embodiment of the present invention. Referring to FIG. 1, in an apparatus that controls gaze tracking according to an exemplary embodiment of the present invention, an imaging device 10 (e.g., a camera) may be configured to capture an image of a user 1, in particular, a face image or an eye image of a user 1 that collects light reaching an image sensor 15 when light transmitting a lens 11 reaches the image sensor 15 to capture an image. In particular, the imaging device 10 may be configured to transfer the captured image to a gaze tracking controller 100.

Herein, the image acquisition object, that is, a position of the user 1 may be estimated based on an incidence angle on the lens 11 of the imaging device 10. Further, the image sensor 15 of the imaging device 10 may be divided into a plurality of zones each of which includes image elements. Therefore, images for each divided zone may be acquired from the image elements disposed in each zone and the images for each zone may be transferred to the gaze tracking controller 100. Hereinafter, characteristics of the lens and the image sensor of the imaging device 10 will be described in more detail with reference to FIG. 2.

The gaze tracking controller 100 may be configured to estimate the position of the illumination reflection point based on the images acquired by the imaging device 10, the incidence angle on the lens 11, the position information of the zones in which the image element acquiring the corresponding images is disposed, and the like and may be configured to track the gaze of the user 1 based on the estimated position. In particular, the gaze tracking controller 100 may be configured to estimate the illumination reflection point of an eye image of the user 1, by determining a lens point spread function (PSF) and an image sensor PSF, respectively, based on the image photographed by the imaging device 10 and the characteristic information received from the lens 11 and the image sensor 15 of the imaging device 10 and using imaging device PSF determined from the determined lens PSF and image sensor PSF. Hereinafter, an operation of determining the illumination reflection points, in particular, the central values of the illumination reflection points by the gaze tracking controller 100 will be described in more detail with reference to FIG. 3.

Figure 2:
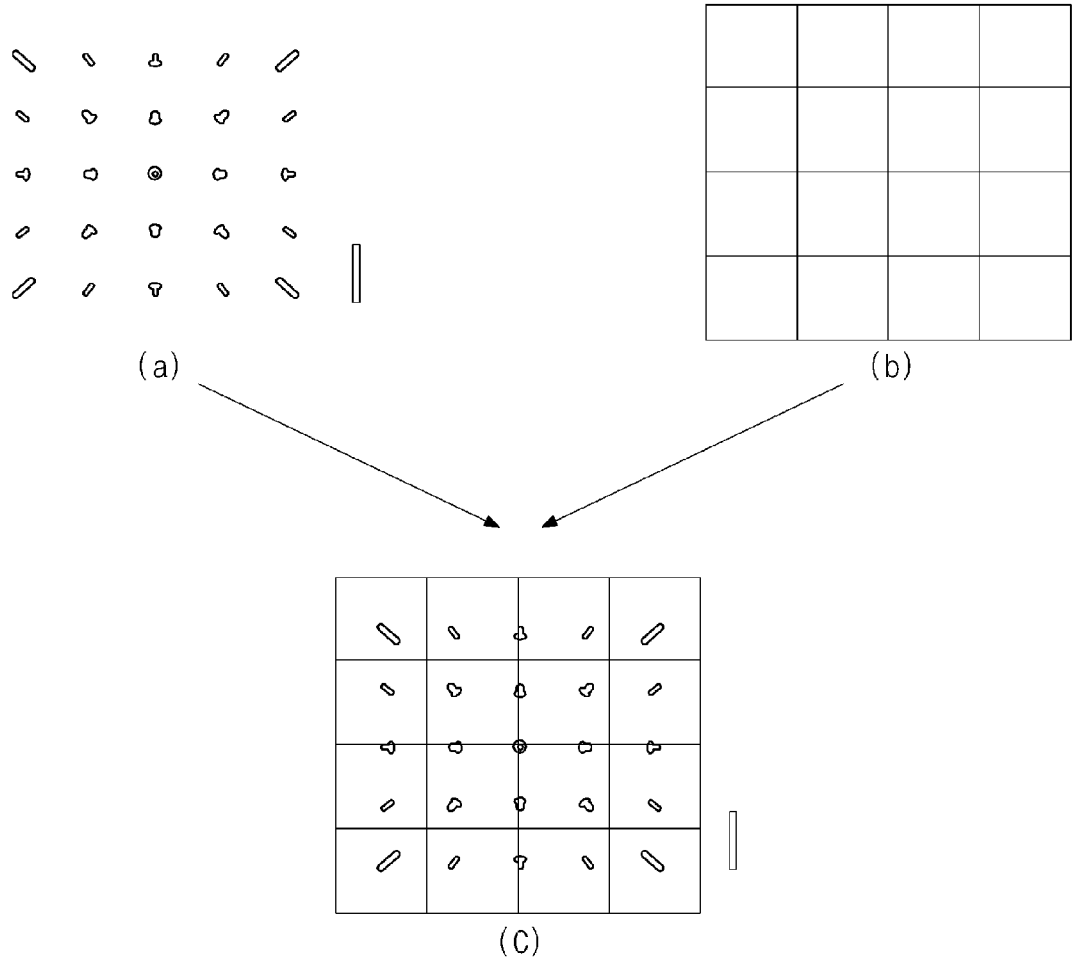
FIG. 2 is an exemplary diagram illustrating a configuration of a lens and an image sensor for an imaging device illustrated in FIG. 1 according to an exemplary embodiment of the present invention.

FIG. 2 is an exemplary diagram illustrating a configuration of a lens and an image sensor for an imaging device illustrated in FIG. 1. When the eye image of the user is captured by the imaging device, light reflected from the user's eye is incident on the lens and the light incident on the lens is refracted, which may be transferred to the image sensor. In particular, the light incident on the lens has a refracted angle varying according to the incidence angle, causing the position of the light reaching the image sensor to vary. FIG. 2A illustrates an exemplary light spreading phenomenon according to an incidence angle at each incidence position. The gaze tracking apparatus may be configured to determine the lens PSF for each incidence angle as illustrated in FIG. 2A.

Moreover, as illustrated in FIG. 2B, the image sensor may be divided into a plurality of zones and may be disposed to allow the image element to correspond to each divided zone. In particular, the position information of each divided zone, the information on the zone in which each image element is disposed, and the like, may be provided to the gaze tracking controller. The position information for each divided zone of the image sensor may be provided to the gaze tracking controller in advance and may be transferred simultaneously at the time of transferring the captured image. As illustrated in FIG. 2B, the gaze tracking apparatus may be configured to determine the image sensor PSFs for each position of the divided zones. Furthermore, imaging device PSF may be determined by a product of the lens PSF determined from FIG. 2A and the image sensor PSF determined from FIG. 2B.

Figure 3:
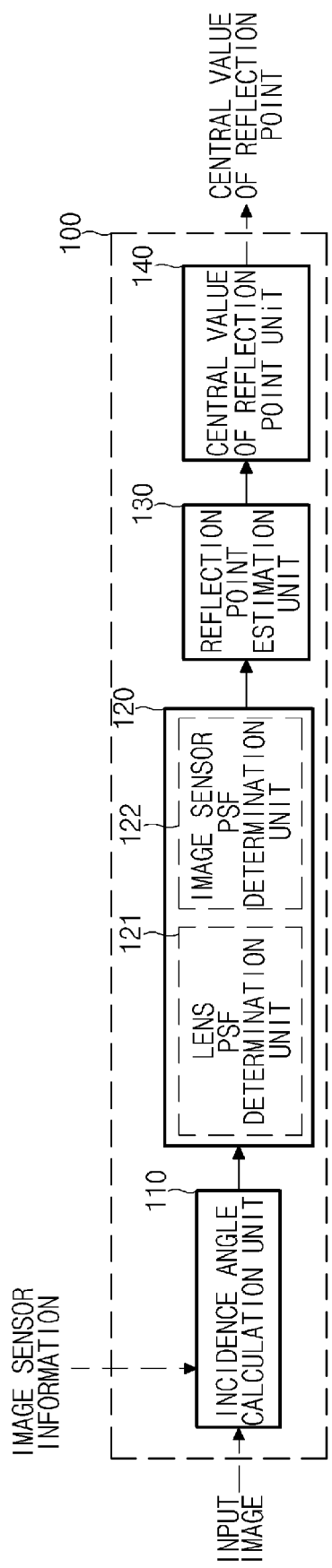
FIG. 3 is an exemplary block diagram illustrating a detailed configuration of a gaze tracking controller according to an exemplary embodiment of the present invention.

FIG. 3 is an exemplary block diagram illustrating a detailed configuration of a gaze tracking controller according to the exemplary embodiment of the present invention. Referring to FIG. 3, the gaze tracking controller 100 may include a plurality of units executed by the gaze tracking controller that includes a processor and a storage device. The plurality of units may include an incidence angle calculation unit 110, a PSF determination unit 120, a reflection point estimation unit 130, and a central value determination unit 140.

First, the incidence angle calculation unit 110 may be configured to calculate the incidence angle to the lens from the image acquired from the image elements for each zone. In particular, the incidence angle calculation unit 110 may be configured to calculate the incidence angles for each zone by applying an effective pin aperture detected by imaging device correction using a pinhole camera model and coordinate values of the image element to the following [Equation 1].

$$\theta_x = \tan^{-1}\left(\frac{x}{\text{focal length } x}\right) \quad \text{[Equation 1]}$$

As such, the incidence angle calculation unit 110 may be configured to change the image acquisition coordinates of the imaging device into the incidence angle according to the above [Equation 1], thereby reducing the sensitivity of the PSF for the pattern position used during the process of determining the lens PSF. In particular, the incidence angle calculation unit 110 may be configured to transfer the information on the calculated incidence angle for each zone to the PSF determination unit 120.

The PSF determination unit 120 may be configured to determine the PSF to estimate the illumination reflection point and may include the lens PSF determination unit 121 and the image sensor PSF determination unit 122. In this configuration, the lens PSF determination unit 121 may be configured determine the lens PSF for the incidence angle to the lens based on the information input from the incidence angle calculation unit 110. Further, the image sensor PSF determination unit 122 may be configured to determine the image sensor PSF for each zone.

The PSF determination unit 120 may be configured to determine imaging device PSF from the lens PSF determined by the lens PSF determination unit 121 and the image sensor PSF determined by the image sensor PSF determination unit 122. In particular, imaging device PSF, that is, f_PSF may be represented by a sum of Gaussian functions as in the following [Equation 2].

$$f_{PSF} = \sum_i \alpha_i \exp\left(-\frac{(x_i - x_{i0})^2 + (y_i - y_{i0})^2}{2\sigma_i^2}\right) \quad \text{[Equation 2]}$$

In the above Equation 2, i represents summation indexes for each zone, i0 represents a central value of an i-th zone, x and y represent coordinate values for each zone of the image sensor, α represents weight values allocated to each zone, and σ represents dispersion values of each zone. Herein, the f_PSF of the above [Equation 2] is an example, and therefore may be represented by another function.

The PSF determination unit 120 may be configured to transfer the information on the f_PSF determined as above to the reflection point estimation unit 130. The reflection point estimation unit 130 may be configured to estimate the illumination reflection point based on the f_PSF input from the PSF determination unit 120. In particular, the reflection point estimation unit 130 may be configured to estimate an ideal reflection point g using the f_PSF and a reflection point r acquired from the image based on a principle of dispersing the image of the imaging device according to the f_PSF.

Here, the relationship equation of r, f_PSF, and g depends on the following [Equation 3].

$$r(x,y) = \int f_{PSF}(x-u, y-v) g(u,v) du dv \quad \text{[Equation 3]}$$

In this case, the reflection point estimation unit 130 may be represented by the following [Equation 4] by Fourier transforming the above [Equation 3].

$$R(\omega_x, \omega_y) = F_{PSF}(\omega_x, \omega_y) G(\omega_x, \omega_y) \quad \text{[Equation 4]}$$

Calculating an ideal reflection point g_estimated estimated from the above [Equation 3] and [Equation 4] by the reflection point estimation unit 130 depends on the following [Equation 5].

$$g_{estimated} = \arg_g \min(R_{measure} - R_{predict}) \quad \text{[Equation 5]}$$
$$= \arg_g \min\left(R_{measure} - \int PSF \cdot g\right)$$

Therefore, the reflection point estimation unit 130 may be configured to estimate the ideal reflection point by applying the values calculated and estimated from each process to the above [Equation 5]. Moreover, the reflection point estimation unit 130 may be configured to transfer the information on the reflection point estimated from images for each zone to the central value determination unit 140. In particular, the central value determination unit 140 may be configured to determine, as a central value, a value having a maximum value among the values input from the reflection point estimation unit 130.

Furthermore, the gaze tracking controller may be configured to track the user's gaze using the coordinates information of the determined central value. Further, the gaze tracking controller may also provide the information on the reflection point central coordinates to another gaze tracking system or a driver monitoring system.

The operation flow of the apparatus that controls gaze tracking according to the embodiment of the present invention configured as described above will be described in more detail.

Figure 4:
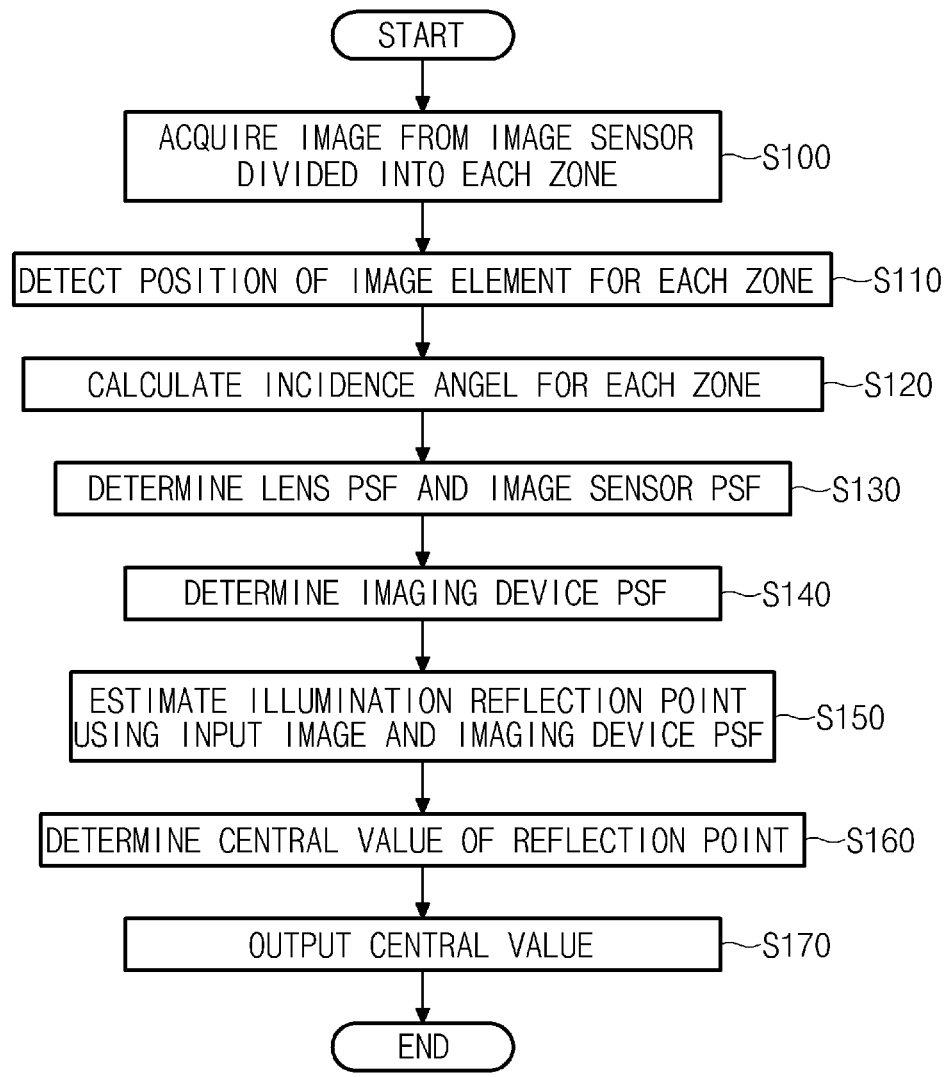
FIG. 4 is an exemplary flow chart illustrating an operation flow of a method for controlling gaze tracking according to an exemplary embodiment of the present invention.

FIG. 4 is an exemplary flow chart illustrating an operation flow of a method for controlling gaze tracking according to an exemplary embodiment of the present invention. Referring to FIG. 4, the apparatus that controls gaze tracking may be configured to detect the positions of the image elements for each zone (S110) and calculate the incidence angle to the lenses for each zone (S120), by acquiring images for each zone from the image sensors divided into each zone (S100). The detailed embodiment of the operation of calculating the incidence angle to the lenses for each zone in 'S120' will refer to the description of [Equation 1].

Next, the apparatus that controls gaze tracking may be configured to determine the lens PSF and the image sensor PSF based on the image acquired in 'S100' and the information acquired in 'S110' and 'S120' (S130) and determine imaging device PSF from the determined lens PSF and image sensor PSF in 'S130' (S140). The detailed embodiment of the operation of calculating imaging device PSF in 'S140' will refer to the description of [Equation 2].

The apparatus that controls gaze tracking may be configured to estimate the illumination reflection point based on the input image acquired in 'S100' and imaging device PSF determined in 'S140' (S150) and determine the central values of the illumination reflection points estimated in 'S150', when imaging device PSF is determined in 'S140' (S160). In 'S160', a point having a maximum value among values included in the estimated illumination reflection points may be determined as the central point Next, the apparatus that controls gaze tracking may be configured to output the central values of the reflection points determined in 'S160' to use the gaze tracking of the user.

According to the exemplary embodiment of the present invention, it may be possible to provide the central values of the reflection points more accurately with a lower error rate by estimating the reflection point based on the images for each zone acquired by dividing the image sensor into the plurality of zones and the characteristic information received from the image sensor and the lens.

Further, according to the exemplary embodiment of the present invention, it may be possible to reduce the sensitivity of PSF while determining the lens PSF by converting the coordinates acquired by an imaging device into the incidence angle and detect the reflection point with increased accuracy by compensating for the light spreading due to the lens and the image element by determining the lens PSF and the image sensor PSF, respectively and determining the PSF of the imaging device from the lens PSF and the image sensor PSF.

As described above, the apparatus and method that controls gaze tracking are described with reference to the illustrated drawings, but the present invention is no limited to the embodiments and the drawings disclosed in the present specification and therefore, can be modified within the scope of the technical scope of the present invention.

What is claimed is:

1. An apparatus that controls gaze tracking, comprising:
an imaging device having an image sensor divided into a plurality of zones; and
a gaze tracking controller configured to:
  determine a lens point spread function (PSF) and an image sensor PSF of the imaging device, respectively, using images for each zone acquired from image elements disposed in each zone of the image sensor; and
  estimate illumination reflection points using an imaging device PSF determined from the determined lens and image sensor PSFs while detecting user gaze using the imaging device.

2. The apparatus according to claim 1, wherein the gaze tracking controller is further configured to:
calculate an incidence angle to the lens of the imaging device with respect to the images for each zone;
determine the lens PSF and the image sensor PSF based on the calculated incidence angle and location information of the image elements disposed in each zone;
determine the imaging device PSF from the lens PSF and the image sensor PSF;
estimate the illumination reflection points using the images for each zone and the imaging device PSF; and
determine central values of the estimated illumination reflection points.

3. The apparatus according to claim 2, wherein the gaze tracking controller is further configured to:
determine the imaging device PSF from a product of the lens PSF and the image sensor PSF.

4. The apparatus according to claim 2, wherein the gaze tracking controller is further configured to:
calculate the estimated illumination reflection points using the determined imaging device PSF and coordinate information of the reflection points acquired from images from each zone.

5. The apparatus according to claim 2, wherein the gaze tracking controller is further configured to:
determine, as a central value, a point having a maximum value among the estimated reflection points.

6. A method for controlling gaze tracking, comprising:
receiving, by a controller, a plurality of images for each zone from image sensors divided into a plurality of zones of an imaging device;
determining, by the controller, a lens PSF and an image sensor PSF of the imaging device, respectively, using the images for each zone;
determining, by the controller, an imaging device PSF from the lens PSF and the image sensor PSF;
estimating, by the controller, illumination reflection points for an input image using the imaging device PSF; and
determining, by the controller, a central value of the estimated reflection points.

7. The method according to claim 6, wherein in the estimating of the illumination reflection points, the estimated reflection points are calculated based on the determined imaging device PSF and coordinate information of the reflection points acquired from images from each zone.

8. The method according to claim 6, wherein in the determining of the central value, a point having a maximum value among the estimated reflection points is determined as a central value.

9. The method according to claim 6, further comprising:
calculating, by the controller, an incidence angle to the lens of the imaging device with respect to the images for each zone.

10. The method according to claim 9, wherein in the determining of the imaging device PSF, the lens PSF and the image sensor PSF are determined based on the calculated incidence angle and position information for each zone of the image sensor.

11. The method according to claim 6, wherein in the determining of the imaging device PSF, the imaging device PSF is determined from a product of the lens PSF and the image sensor PSF.

12. A non-transitory computer readable medium containing program instructions executed by a processor or controller, the computer readable medium comprising:
program instructions that receive a plurality of images for each zone from image sensors divided into a plurality of zones of an imaging device;
program instructions that determine a lens PSF and an image sensor PSF of the imaging device, respectively, using the images for each zone;
program instructions that determine an imaging device PSF from the lens PSF and the image sensor PSF;
program instructions that estimate illumination reflection points for an input image using the imaging device PSF; and
program instructions that determine a central value of the estimated reflection points.

13. The non-transitory computer readable medium of claim 12, wherein the program instructions calculate the estimated reflection points based on the determined imaging device PSF and coordinate information of the reflection points acquired from images form each zone.

14. The non-transitory computer readable medium of claim 12, wherein the program instructions determine a point having a maximum value among the estimated reflection points as a central value.

15. The non-transitory computer readable medium of claim 12, further comprising:
program instructions that calculate an incidence angle to the lens of the imaging device with respect to the images for each zone.

16. The non-transitory computer readable medium of claim 15, wherein the program instructions determines the lens PSF and the image sensor PSF based on the calculated incidence angle and position information for each zone of the image sensor.

17. The non-transitory computer readable medium of claim 12, wherein the program instructions determine the imaging device PSF from a product of the lens PSF and the image sensor PSF.

* * * * *